United States Patent [19]

Muraki et al.

[11] Patent Number: 5,179,154
[45] Date of Patent: Jan. 12, 1993

[54] RUBBER COMPOSITIONS FOR TIRE TREAD

[75] Inventors: Takao Muraki, Hiratsuka; Kazuyoshi Kayama, Yokohama; Kinya Kawakami, Kanagawa, all of Japan

[73] Assignee: The Yokohama Rubber Co., Ltd., Japan

[21] Appl. No.: 639,775

[22] Filed: Jan. 14, 1991

Related U.S. Application Data

[63] Continuation of Ser. No. 459,657, Jan. 2, 1990, abandoned.

[30] Foreign Application Priority Data

Jan. 10, 1989 [JP] Japan .................................. 1-2128

[51] Int. Cl.$^5$ .................................................. C08K 3/04
[52] U.S. Cl. ...................................... 524/496; 524/495; 524/847
[58] Field of Search ..................... 524/495, 496, 847

[56] References Cited

FOREIGN PATENT DOCUMENTS

| 3635366 | 4/1987 | Fed. Rep. of Germany | 524/496 |
| 60-31546 | 2/1985 | Japan | 524/496 |
| 0231037 | 10/1986 | Japan | 524/496 |
| 0129327 | 6/1987 | Japan | 524/496 |
| 0143945 | 6/1987 | Japan | 524/496 |
| 62-143947 | 6/1987 | Japan | 524/496 |
| 63-199748 | 8/1988 | Japan | 524/496 |
| 0275643 | 11/1989 | Japan | 524/496 |

Primary Examiner—Paul R. Michl
Assistant Examiner—Peter Szekely
Attorney, Agent, or Firm—Finnegan, Henderson, Farabow, Garrett & Dunner

[57] ABSTRACT

Rubber compositions are disclosed for use in the tread portions of automotive tires. A selected class of starting rubbers are combined with specified amounts of a selected type of carbon black having well balanced $N_2SA$, 24M4DBP and $\Delta Dst$ properties. The use of this carbon black is conductive to enhanced driving stability and other important physical characteristics of the tire.

3 Claims, No Drawings

RUBBER COMPOSITIONS FOR TIRE TREAD

This application is a continuation of application Ser. No. 459,657, filed Jan. 2, 1990 now abandoned.

BACKGROUND OF THE INVENTION

1. Field of the Invention

This invention relates to rubber compositions suitable for use particularly in the tread portion of a tire. More particularly, the invention is directed to the provision of such a composition comprised of a selected rubber combined with a selected type of carbon black of specified particle characteristics.

2. Description of Prior Art

Tires for sophisticated sports cars are required to meet high mechanical strength and driving stability. To attain improved stability, an approach has been proposed to cope with this trend with the use of a tread rubber of high tan δ at 0° C. and 60° C. This quality is closely associated with the gripping force of the tire on the road surface.

To increase tan δ at 0° C. and 60° C., polymeric rubbers of high glass transition temperatures (Tg) have been used which are selected for instance from styrene-butadiene copolymer rubbers abundant in styrene content or 1,2-vinyl content. Alternatively, large amounts of carbon black have been incorporated with a selected starting rubber.

High Tg rubbers, however, are not wholly satisfactory as they are rather dependent on temperature conditions, insufficiently hard and rigid at elevated temperature and inadequate in road gripping and are reduced in mechanical strength.

Too much carbon black fails to become homogeneously dispersible, rendering the finished rubber composition mechanically weak.

SUMMARY OF THE INVENTION

With the foregoing difficulties of the prior art in view, the present invention seeks to provide an improved rubber composition for use in the treads of automobile tires which excels in running stability and mechanical strength at high temperature and other important physical characteristics, thus contributing to efficient, safe driving.

Other objects and advantages of the invention will be better understood from the following description.

More specifically, the invention provides a rubber composition for use in automotive tire treads, which comprises: (a) 100 parts by weight of one or more selected styrene-butadiene copolymer (SBR) of higher than −40° C. in Tg; and (b) 50–200 parts by weight of carbon black having an $N_2SA$ in the range of 110–140 $m^2/g$ as defined by nitrogen adsorption surface area, a 24M4DBP of 85–95 ml/100 g, a ΔDst of less than 55 mμ as defined by the half value width of a centrifugally classified aggregate size distribution and a $\Delta Dst/N_2SA$ of less than 0.43.

DETAILED DESCRIPTION OF THE INVENTION

Rubber compositions according to the present invention are essentially comprised of a selected class of starting rubbers hereafter referred to as "component (I)" and a selected type of carbon black hereafter referred to as "component (II)".

Component (I) is a selected styrene-butadiene copolymer rubber (SBR) of higher than −40° C. in glass transition temperature (Tg). Two or more such rubbers of different Tg temperatures may be blended to attain a required gripping force and desired low-temperature properties.

When found desirable, there may be used a diene rubber other than the above SBR rubber.

The amount of the diene rubber is not specifically restricted but preferably up to 0-80% by weight per 100 to 20% of SBR. Typical examples of this component include natural rubber, polyisoprene rubber, styrene-butadiene polybutadiene rubber, butyl rubber, halogenated butyl rubber and like tread rubbers in common use. High Tg styrene-butadiene copolymer rubbers are not satisfactory as they become more dependent in hardness upon temperature, and their rigidity, tensile strength and abrasion-resistance are considerably reduced at a temperature in the range of 20° C.–100° C. at which the tire is normally in service.

It has now been found that the use of component (II) allows the use of a diene rubber having a Tg higher than −40° C. without decreasing tan δ at 60° C.

Component (II) suitable for the purpose of the invention should meet certain physical characteristics determined by the following methods.

Nitrogen Adsorption Surface Area $(N_2SA)(m^2/g)$

ASTM D-3037-78 "Standard Method of Testing Carbon Surface Area by Nitrogen Adsorption" Method C.

24 M4 DBP Absorption (24M4DBP)(ml/100 g)

Measurement is made as stipulated in ASTM D-3493.

Half Value Width of Aggregate Size Distribution (ΔDst)(mμ)

Centrifugal classification is effected with the use of a disc centrifuge manufactured by Joice Loeble Co., England. A carbon black sample is accurately weighed and then added with a 20% aqueous ethanol solution and a surfactant, followed by ultrasonic dispersion to provide a dispersion concentrated to 5 mg/100 cc. The resulting dispersion is subjected to the above centrifuge set at 8,000 rpm. Into the centrifuge are put 10 ml of a spin liquid in distilled water, subsequently 0.5 ml of a buffer in 20% by volume of ethanol and finally 0.5 to 1.0 ml of carbon black dispersion injected by a syringe.

Centrifugation is initiated and a photoelectric recorder switched on to draw a distribution curve of aggregates converted by Stokes mode of diameter. ΔDst is determined from the half value width of the maximum absorbance on a histgram.

Importantly, component (II) should have an $N_2SA$ in the range of 110–140 $m^2/g$, a DBP in the range of 85–95 ml/100 g and a ΔDst of smaller than 55 mμ.

Carbon black if smaller than 110 $m^2/g$ in $N_2SA$ would invite inadequate gripping force, reduced driving stability and insufficiently low tan δ at 60° C. Carbon black if larger than 140 $m^2/g$ in $N_2SA$ would lead to improved road gripping force but reduced tensile strength. 24M4DBP less than 85 ml/100 g would result in a rubber mix less resistant to abrasion.

24M4DBP should not exceed 95 ml/100 g as tensile strength of the tire is reduced.

ΔDst should be less than 55 mμ to preclude a decline in tan δ at 60° C. $\Delta Dst/N_2SA$ ratio should not exceed 0.43. ΔDst is a parameter indicating the size distribution and nature of the aggregates. This parameter is closely associated with such conditions as reaction temperature and magnitude of turbulence for carbon black formation.

ΔDst is related to $N_2SA$ in such a way that ΔDst decreases as $N_2SA$ increases and hence $\Delta Dst/N_2SA$ ratio is reduced. The resulting product, if $\Delta Dst/N_2SA$ larger than 0.43, would fail to attain a desired tan δ at 0° C. and 60° C. For carbon black having an $N_2SA$ in the range of 110–140 m²/g, $\delta Dst/N_2SA$ less than 0.43 is particularly effective in attaining increased tan δ at the same temperature.

The amount of component (II) to be blended with component (I) should be between 50 and 200 parts by weight. Smaller amounts would not be effective in attaining sufficient abrasion resistance, whereas larger amounts would make difficult to disperse into the starting rubber.

Various other additives may be employed, if desired, which may include vulcanizing agents such as sulfur, vulcanization accelerators, vulcanization activators, antioxidants, tackifiers, softeners, fillers and the like.

The present invention will now be described by way of the following examples which are provided for illustrative purposes but should not be construed as limiting the invention.

Different rubber compositions were formulated as shown in Table 3 with the use of four SBR rubbers of Table 1 and seven carbon blacks of Table 2, followed by kneading and subsequent vulcanization at 160° C. for 30 minutes. The resulting vulcanizates were examined for their road gripping force (tan δ at 0° C. and 60° C.) and tensile strength ($T_B$) under conditions given below and with the results shown in Table 3.

Gripping Force (tan δ)

Viscoelastic spectrometer manufactured by Iwamoto Seisakusho Co., Ltd. was used at 0° C. and 60° C., each at 10+2% strain and at 20 Hz. The greater the tan δ, the higher the gripping force. Tan δ at 0° C. is taken as a measure of gripping force on wet road and tan δ at 60° C. on dry road.

Tensile Strength ($T_B$)

Measurement was made in accordance with JIS K-6301. The larger the $T_B$, the higher the tensile strength. $T_B$ denotes a breaking force of the rubber compositions.

As appears clear from Table 3, the inventive compositions of Examples 1 to 6 show a sharp rise both in tan δ at 0° C. and 60° C. respectively and in tensile strength.

Failure to meet even one of the above specified CB qualities result in a rubber composition of inadequate tan δ and insufficient tensile strength as evidenced by Comparative Examples 1 to 14.

Many changes and modifications may be made in the above described embodiments as conceived by those skilled in the art within the scope of the appended claims.

TABLE 1

| SBR-1 | Tg: | −30° C. |
|---|---|---|
| | polymerization: | emulsion |
| | styrene content: | 35% |
| | extended oil: | 37.5 wt. parts |
| SBR-2 | Tg: | −21° C. |
| | polymerization: | emulsion |
| | styrene content: | 45% |
| | extended oil: | 37.5 wt. parts |
| SBR-3 | Tg: | −10° C. |
| | polymerization: | solution |
| | styrene content: | 40% |
| | extended oil: | 37.5 wt. parts |
| SBR-4 | Tg: | −51° C. |
| | polymerization: | emulsion |
| | styrene content: | 23.8% |
| | extended oil: (Nipol 1712, Nippon Zeon Co.) | 37.5 wt. parts |

TABLE 2

| | $N_2SA$ (m²/g) | 24M4DBP (ml/100 g) | ΔDst (mμ) | $\Delta Dst/N_2SA$ |
|---|---|---|---|---|
| CB-1 | 120 | 99 | 60 | 0.500 |
| CB-2 | 125 | 99 | 53 | 0.424 |
| CB-3 | 122 | 94 | 59 | 0.484 |
| CB-4 | 123 | 90 | 49 | 0.398 |
| CB-5 | 121 | 100 | 57 | 0.471 |
| CB-6 | 145 | 94 | 52 | 0.359 |
| CB-7 | 135 | 93 | 53 | 0.393 |

CB-1: Dia Black N220M (ISAF), Mitsubishi Chemical Industries Ltd.
CB-2: comparative
CB-3: comparative
CB-4: inventive
CB-5: comparative
CB-6: comparative
CB-7: inventive

TABLE 3-(1)

| Run | Comparative Examples | | | Inventive Example 1 | Comparative Examples | | Inventive Example 2 |
|---|---|---|---|---|---|---|---|
| | 1 | 2 | 3 | | 4 | 5 | |
| Formulations | | | | | | | |
| SBR-1 | | | | | | | |
| SBR-2 | 137.5 | 137.5 | 137.5 | 137.5 | 137.5 | 137.5 | 137.5 |
| SBR-3 | | | | | | | |
| SBR-4 | | | | | | | |
| BR*1) | | | | | | | |
| CB-1 | 90 | | | | | | |
| CB-2 | | 90 | | | | | |
| CB-3 | | | 90 | | | | |
| CB-4 | | | | 90 | | | |
| CB-5 | | | | | 90 | | |
| CB-6 | | | | | | 90 | |
| CB-7 | | | | | | | 90 |
| zinc oxide*2) | 3 | 3 | 3 | 3 | 3 | 3 | 3 |
| stearic acid*3) | 2 | 2 | 2 | 2 | 2 | 2 | 2 |
| antioxidant 6C*4) | 3 | 3 | 3 | 3 | 3 | 3 | 3 |
| aromatic oil*5) | 17.5 | 17.5 | 17.5 | 17.5 | 17.5 | 17.5 | 17.5 |
| accelerator NS*6) | 1.3 | 1.3 | 1.3 | 1.3 | 1.3 | 1.3 | 1.3 |
| sulfur*7) | 1.7 | 1.7 | 1.7 | 1.7 | 1.7 | 1.7 | 1.7 |
| Properties | | | | | | | |

TABLE 3-(1)-continued

| Run | Comparative Examples 1 | 2 | 3 | Inventive Example 1 | Comparative Examples 4 | 5 | Inventive Example 2 |
|---|---|---|---|---|---|---|---|
| tan δ at 0° C. | 1.217 | 1.221 | 1.193 | 1.307 | 1.230 | 1.200 | 1.312 |
| tan δ at 60° C. | 0.579 | 0.563 | 0.572 | 0.615 | 0.533 | 0.589 | 0.645 |
| tensile strength (kg/cm$_2$) | 100.0 | 100.3 | 103.3 | 105.0 | 100.0 | 102.0 | 106.0 |

TABLE 3-(2)

| Run | Comparative Examples 6 | 7 | Inventive Example 3 | Comparative Example 8 | Inventive Example 4 | Comparative Example 9 | Inventive Example 5 |
|---|---|---|---|---|---|---|---|
| Formulations | | | | | | | |
| SBR-1 | 137.5 | 137.5 | 137.5 | 137.5 | 137.5 | | |
| SBR-2 | | | | | | 137.5 | 137.5 |
| SBR-3 | | | | | | | |
| SBR-4 | | | | | | | |
| BR*1) | | | | | | | |
| CB-1 | 90 | | | | | 90 | |
| CB-2 | | | | | | | |
| CB-3 | | 90 | | | | | |
| CB-4 | | | 90 | | | | 90 |
| CB-5 | | | | | | | |
| CB-6 | | | | 90 | | | |
| CB-7 | | | | | 90 | | |
| zinc oxide*2) | 3 | 3 | 3 | 3 | 3 | 3 | 3 |
| stearic acid*3) | 2 | 2 | 2 | 2 | 2 | 2 | 2 |
| antioxidant 6C*4) | 3 | 3 | 3 | 3 | 3 | 3 | 3 |
| aromatic oil*5) | 17.5 | 17.5 | 17.5 | 17.5 | 17.5 | 17.5 | 17.5 |
| accelerator NS*6) | 1.3 | 1.3 | 1.3 | 1.3 | 1.3 | 1.3 | 1.3 |
| sulfur*7) | 1.7 | 1.7 | 1.7 | 1.7 | 1.7 | 1.7 | 1.7 |
| Properties | | | | | | | |
| tan δ at 0° C. | 1.154 | 1.145 | 1.258 | 1.155 | 1.265 | 1.387 | 1.400 |
| tan δ at 60° C. | 0.523 | 0.522 | 0.598 | 0.554 | 0.623 | 0.615 | 0.678 |
| tensile strength (kg/cm$_2$) | 103.0 | 105.8 | 108.0 | 104.0 | 108.0 | 100.0 | 105.0 |

TABLE 3-(3)

| Run | Comparative Examples 10 | 11 | 12 | 13 | Inventive Example 6 | Comparative Example 14 |
|---|---|---|---|---|---|---|
| Formulations | | | | | | |
| SBR-1 | | | | | | |
| SBR-2 | | | | | | |
| SBR-3 | 137.5 | | | 96.25 | 96.25 | 96.25 |
| SBR-4 | | 137.5 | 137.5 | | | |
| BR*1) | | | | 30.00 | 30.00 | 30.00 |
| CB-1 | | 90 | | 90 | | |
| CB-2 | | | | | | |
| CB-3 | | | | | | |
| CB-4 | | | | | 90 | |
| CB-5 | | | | | | |
| CB-6 | 90 | | 90 | | | 90 |
| CB-7 | | | | | | |
| zinc oxide*2) | 3 | 3 | 3 | 3 | 3 | 3 |
| stearic acid*3) | 2 | 2 | 2 | 2 | 2 | 2 |
| antioxidant 6C*4) | 3 | 3 | 3 | 3 | 3 | 3 |
| aromatic oil*5) | 17.5 | 17.5 | 17.5 | 17.5 | 17.5 | 17.5 |
| accelerator NS*6) | 1.3 | 1.3 | 1.3 | 1.3 | 1.3 | 1.3 |
| sulfur*7) | 1.7 | 1.7 | 1.7 | 1.7 | 1.7 | 1.7 |
| Properties | | | | | | |
| tan δ at 0° C. | 1.356 | 0.866 | 0.878 | 0.923 | 1.006 | 0.924 |
| tan δ at 60° C. | 0.654 | 0.413 | 0.450 | 0.455 | 0.520 | 0.482 |
| tensile strength (kg/cm$_2$) | 97.0 | 103.0 | 105.0 | 90.1 | 94.5 | 91.0 |

*1)Nipol 1240 (Vinyl-rich BR, Nippon Zeon Corp.)
*2)No. 3 Zinc Oxide (Seidou Corp.)
*3)Lunac YA (Stearic acid for industrial use, Kao Corp.)
*4)Nocrac 6C [N-(1,3-dimethylbutyl)-N'-phenyl-p-phenylenediamine] (Daimon Shinko Kagaku Corp.)
*5)Kyoseki Process X-140 (Aromatic oil, Kyodou Sekiyu Corp.)
*6)Santocure NS (N-terto-butyl-2-benzotiazole sulfenamide, Monsanto Corp.)
*7)Oil-treated sulfur

What is claimed is:

1. A rubber composition for use in automotive tire treads, which comprises:

(a) 100 parts by weight of a starting rubber comprising at least one styrene-butadiene copolymer rubber having a glass transition temperature (Tg) of higher than $-40°$ C.; and (b) 50-200 parts by weight of carbon black having an $N_2SA$ in the range of 110-140 $m^2/g$ as defined by nitrogen adsorption surface area, a 24M4DBP in the range of 85-95 ml/100 g as defined by ASTM D-3493, a $\Delta Dst$ of less than 55 m$\mu$ as defined by the half value width of a centrifugally classified aggregate size distribution and a $\Delta Dst/N_2SA$ ratio less than 0.43.

2. A rubber composition according to claim 1 further including a diene rubber other than said styrene-butadiene rubber.

3. A rubber composition according to claim 2 wherein said diene rubber is selected from the group consisting of natural rubber, polyisoprene rubber, styrene-butadiene copolymer rubber having a Tg of lower than $-40°$ C., butadiene rubber, butyl rubber and combinations thereof.

* * * * *